(12) United States Patent
Mahar et al.

(10) Patent No.: US 9,969,563 B2
(45) Date of Patent: *May 15, 2018

(54) METERING SYSTEM FOR VIAL DELIVERY SYSTEM

(71) Applicant: Humana Inc., Louisville, KY (US)

(72) Inventors: Michael Mahar, Phoenix, AZ (US); Toan Trinh, Phoenix, AZ (US)

(73) Assignee: HUMANA INC., Louisville, KY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/670,046

(22) Filed: Aug. 7, 2017

(65) Prior Publication Data

US 2018/0086569 A1 Mar. 29, 2018

Related U.S. Application Data

(63) Continuation of application No. 15/279,599, filed on Sep. 29, 2016.

(51) Int. Cl.
| | |
|---|---|
| *B65G 51/28* | (2006.01) |
| *B65G 47/06* | (2006.01) |
| *B65G 47/14* | (2006.01) |
| *B25J 9/16* | (2006.01) |
| *B65G 47/91* | (2006.01) |
| *B65G 47/19* | (2006.01) |
| *B65G 47/51* | (2006.01) |

(52) U.S. Cl.
CPC ............ *B65G 47/06* (2013.01); *B25J 9/1653* (2013.01); *B25J 9/1679* (2013.01); *B25J 9/1694* (2013.01); *B65G 47/14* (2013.01); *B65G 47/19* (2013.01); *B65G 47/51* (2013.01); *B65G 47/91* (2013.01); *B65G 47/917* (2013.01)

(58) Field of Classification Search
None
See application file for complete search history.

(56) References Cited

U.S. PATENT DOCUMENTS

| | | |
|---|---|---|
| 3,089,732 A | 5/1963 | Gamberini |
| 4,740,113 A | 4/1988 | Hirose et al. |
| 5,647,697 A | 7/1997 | Gigante et al. |
| 5,706,931 A | 1/1998 | Gori et al. |
| 5,709,506 A | 1/1998 | Beard et al. |
| 9,499,354 B2 | 11/2016 | Jones et al. |

*Primary Examiner* — William R Harp
(74) *Attorney, Agent, or Firm* — Standley Law Group LLP

(57) ABSTRACT

An automated method and system for transitioning a bottle from a horizontal belt conveyor to the entrance of an air conveyor, and vice versa, from an air conveyor to a horizontal belt conveyor. An indexer in a circular arrangement moves around 180 degrees clockwise until the bottle drops into the air conveyor (e.g., pneumatic tube). This motion controls the bottle's movement; otherwise, the bottle would free-fall off the conveyor. The indexer rotary device provides control of the vial transition, keeping it vertical so it goes into the tube in a controlled manner.

29 Claims, 3 Drawing Sheets

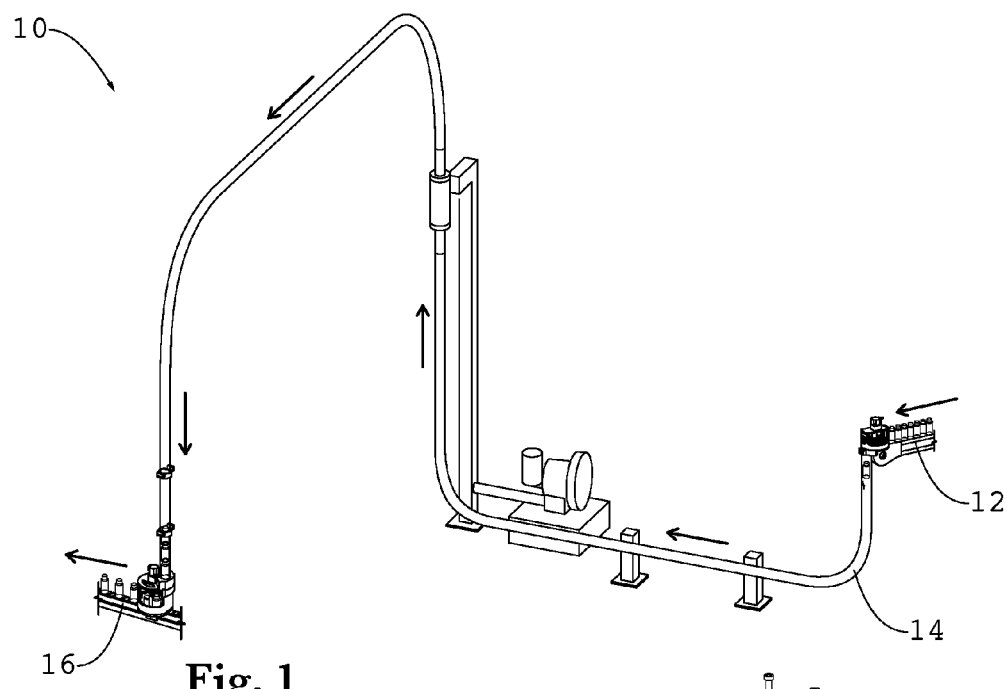
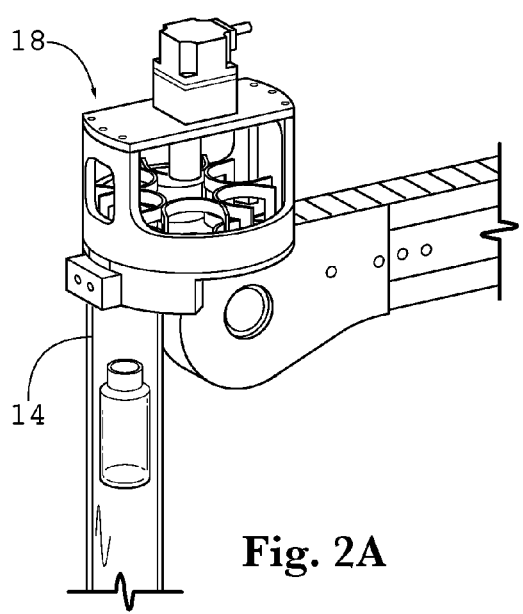
Fig. 2A
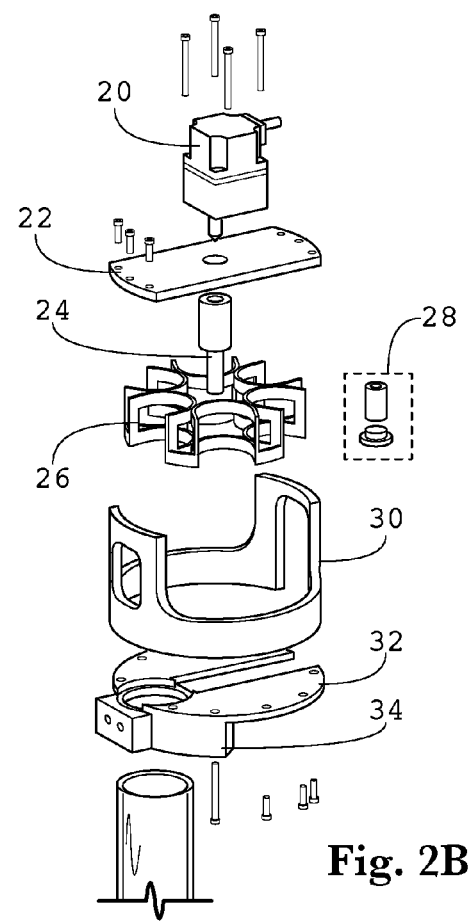
Fig. 2B
Fig. 1

METERING SYSTEM FOR VIAL DELIVERY SYSTEM

CROSS-REFERENCE TO RELATED APPLICATIONS

This application is a continuation of U.S. application Ser. No. 15/279,599, filed Sep. 29, 2016, issued as U.S. Pat. No. 9,802,804, the content of which is hereby incorporated by reference as if fully recited herein.

BACKGROUND OF THE INVENTIVE FIELD

The present invention is directed to the field of automated dispensing systems, more particularly to the transport of objects such as pharmacy bottles/vials through an automated dispensing system. The present invention relates to an automated method and system for transitioning a bottle from a horizontal belt conveyor to the entrance of an air conveyor, and vice versa, from an air conveyor to a horizontal belt conveyor.

Many health benefit plan providers and retail pharmacies now offer their clients the option of obtaining prescription drugs by mail. Mail order pharmacies ship prescription drugs to a client's home so the client is not required to visit a pharmacy and to fill a prescription in person. For clients with chronic conditions or other conditions that require maintenance drugs, a mail order prescription program is an attractive benefit because it is more convenient for the clients and typically less expensive than obtaining prescription drugs at a neighborhood pharmacy. For many drugs, clients have the option of purchasing a drug fill in a 60-day or even a 90-day supply at a lower cost than a 30-day supply.

Many mail order pharmacies use automated systems and dispensing lines to process and ship a high volume of prescriptions on a daily basis. Depending upon how the technology is implemented and deployed within a mail order pharmacy, a substantial number of steps in the fulfillment process may be automated and the need for human intervention minimized. Transporting bottles through the automated dispensing lines in an efficient, timely, accurate, and consistent manner is crucial for filling the high volume of mail order prescriptions.

SUMMARY OF THE GENERAL INVENTIVE CONCEPT

In the preferred embodiment of the invention, the system for moving vials along an automated dispensing line is comprised of: a first horizontal conveyor adapted to move vials in the horizontal direction; a first vertical pneumatic conveyor positioned above or below the first horizontal conveyor; a first rotating portion comprised of a plurality of apertures disposed in a circular arrangement, each of the apertures adapted to accept and hold one of the vials; a motor operationally connected to the first rotating portion for driving the first rotating portion; and a guide mechanism operationally connected between the first rotating portion and the first vertical pneumatic conveyor for guiding a vial as it moves between the first rotating portion and the first vertical pneumatic conveyor.

The foregoing and other features and advantages of the present invention will be apparent from the following more detailed description of the particular embodiments, as illustrated in the accompanying drawings.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein:

FIG. 1 illustrates one embodiment of an object metering system on an automated dispensing line for transporting objects such as pharmacy vials;

FIG. 2A illustrates one embodiment of the metering devices of the present invention;

FIG. 2B illustrates an exploded view of FIG. 2A;

DETAILED DESCRIPTION OF EXEMPLARY EMBODIMENT(S)

Figure 3A:
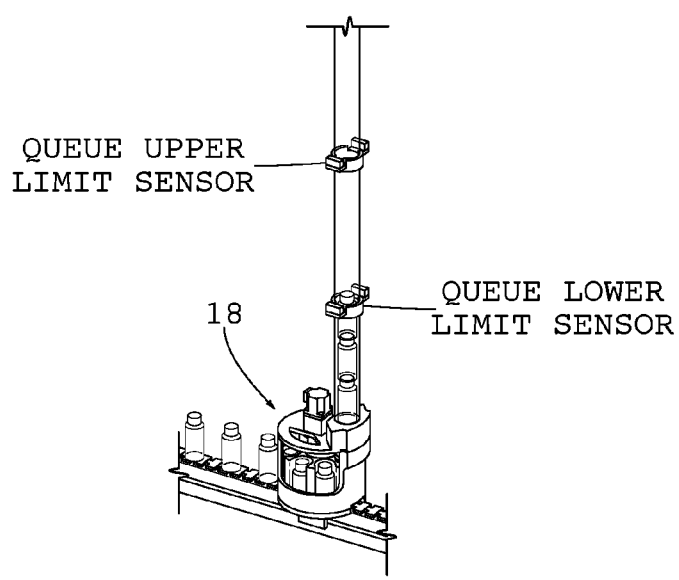
FIG. 3A illustrates another embodiment of the metering device of the present invention.

One embodiment of an object metering system of an automated dispensing line 10 for transporting objects such as pharmacy bottles/vials is shown in FIG. 1. In this embodiment, vials are transported on a horizontal conveyor 12 from an accumulation table. The vials move from the horizontal conveyor to a pneumatic conveyor 14 that uses air from a blower system to move the vials through the system. The vials then move from the pneumatic (air) conveyor back onto another horizontal conveyor 16 for transport to another location of the dispensing system, such as a vial labeler.

The present invention relates to metering devices that transition the vials from the conveyor to the pneumatic conveyor and, vice versa, from the pneumatic conveyor to the conveyor. FIGS. 2A and 2B illustrate one embodiment of the vial transition/metering/indexing system 18 of the present invention at the point where the vials transition from the horizontal conveyor to the entrance of the air conveyor. FIG. 2A illustrates one embodiment of the invention having a six-slot rotary disc component that rotates clockwise to drop vials into the air conveyor when a low level limit is detected by the low-limit sensor. FIG. 2B illustrates an exploded view of the metering device shown in FIG. 2A. In the preferred embodiment, the metering device acts as a gate when the vial queue at the labeling system is full. For example, vials are prevented from entering the air conveyor when vials are not needed. The rotational speed of the motor on the metering device is adjustable. Each full revolution of the rotary disc will preferably deliver/drop six vials into the air conveyor.

In the embodiment of the metering device shown in FIG. 2B, the metering device is comprised of: 1) a motor 20 (e.g., Oriental motor and gear box assembly) that powers the metering device; 2) a mount 22 made of ABS-PVC blend holds the motor in place; 3) a ½ inch diameter aluminum shaft 24 connects the motor to the index assembler, enabling the rotary function; 4) the turn-style type rotary indexer assembler 26; 5) a coupler that connects the motor to the shaft and a flange 28 mates the shaft to the indexer; 6) housing 30 for holding the indexer in place; and 7) a bottom portion 32 of the indexer housing having a funnel 34 for guiding a vial from one of the indexer slots/openings into the air conveyor.

On the six-slot indexer shown in FIGS. 2A and 2B, the vials transfer from the horizontal conveyor onto the indexer and the support plate. In the embodiment shown, the indexer is comprised of six slots or apertures for accepting a vial disposed in a circular arrangement.

The indexer goes around in a continuous clockwise motion at predetermined speed and drops each vial at 180 degrees relative to the centralized location, allowing the vial to fall into the air conveyor (e.g., pneumatic tube). This motion controls the vial's movement; otherwise, the vial would free-fall off the conveyor. The indexer rotary device provides control of the vial dropping down, keeping it vertical so it goes into the tube in a controlled manner. The shaft spins to rotate the indexer. Conversely, when the indexer is not turning, vials are not dropping into the tube, which provides a built-in, on-demand metering capability. The housing keeps all parts in place. The bottom support plate acts as a mount for the whole assembly and is preferably bolted onto the conveyor.

When one labeler has enough vials for current demand, the indexer metering system also serves as a gate, preventing vials from entering the line until such time as more are needed. This is accomplished by responding to controls to prevent further vials from being sent via the blower. It is appreciated that the indexer may be made smaller or bigger based on needs of the dispensing line, for example, an 8-slot indexer is shown in the next embodiment of FIG. 3.

The indexer metering system shown in FIGS. 2A and 2B is powered by an Oriental variable-speed motor. In this embodiment, one revolution releases six vials into the tube. Thus, for example, if the line requires 24 vials per minute, the indexer needs to rotate four revolutions per minute. The motors run each indexer control speed with a 50:1 gear ratio and direction; the indexers are set to operate clockwise but could run counterclockwise if required. A motor driver adjusts their speed.

Figure 3B:
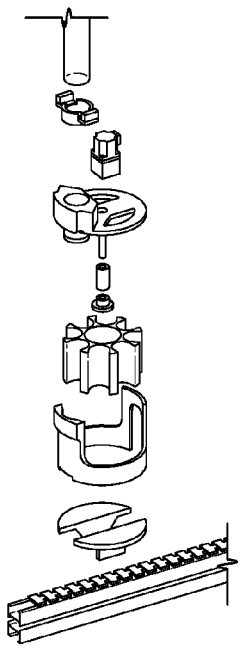
FIG. 3B illustrates an exploded view of FIG. 3A.

FIGS. 3A and 3B illustrate one embodiment of the vial transition/metering/indexing system of the present invention at the point where the vials transition from the air conveyor onto the horizontal conveyor. FIG. 3A illustrates one embodiment of the invention having an eight-slot rotary disc component. FIG. 3B illustrates an exploded view of the metering device shown in FIG. 3A.

Figure 4:
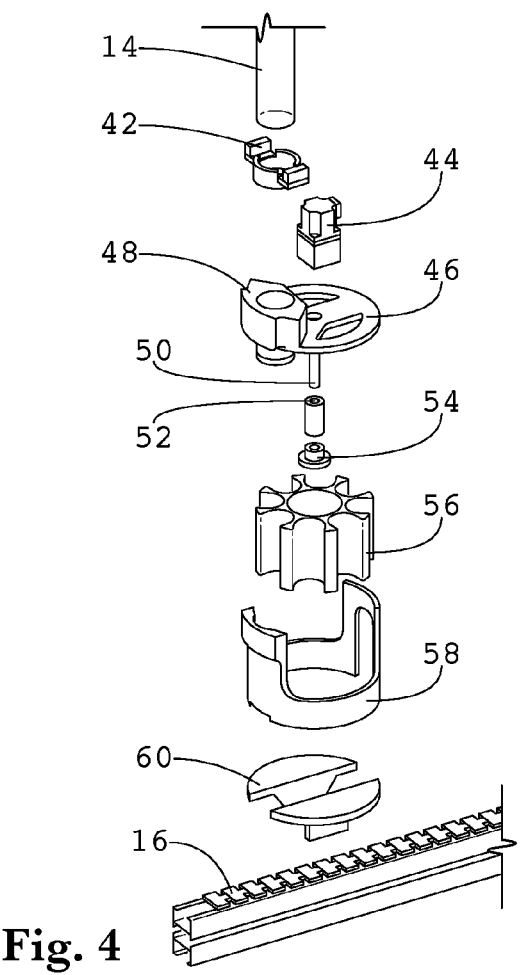
FIG. 4 illustrates another exploded view of FIG. 3A with components labeled.

The metering device of FIGS. 3A and 3B is comprised of an eight-slot turn-style type indexer that drops vials from the pneumatic conveyor onto the horizontal belt conveyor in preparation for labeling (e.g., the step before the vials are married to a puck). FIG. 4 illustrates a larger view of FIG. 3B labeled by its individual components.

The metering device of the present invention is operationally connected to the pneumatic tube where vials collect before entering the indexer metering system in preparation for labeling. In one embodiment of the invention as shown in FIG. 4, the metering device is comprised of: 1) a 3-D printed collar 42 for mounting a photo eye sensor; 2) a motor and gear box assembly 44; 3) a top portion 46 of the indexer housing that also serves as the motor mount and infeed system (the funnel 48 guides the vials into one of the indexer slots for eventual depositing onto the horizontal conveyor line); 4) a ½ inch aluminum shaft 50 connecting the motor to the indexer assembly, enabling the rotary function of the indexer; 5) a coupler 52 for connecting the motor to the shaft and a flange collar 54 that mates the shaft to the indexer; 6) an 8-slot indexer 56 for catching, holding, and rotating vials from the vertical air conveyor tube to a standing position onto the horizontal conveyor line; 7) a housing 58 for holding the indexer in place; and 8) a bottom support plate 60 for connecting the metering device to the conveyor line 16.

In this embodiment of FIG. 4, the top plate not only serves as a motor mount, it also acts as the infeed funnel for the indexer system. This means the vial slides into the eight-slot indexer's infeed funnel and is guided down into an opening and then spun around 180 degrees clockwise, by the shaft, until it is deposited onto the moving horizontal conveyor.

In the preferred embodiment, a network of sensors and control gates detect and distribute the flow of bottles to individual labelers dependent upon the bottle queue at each labeler. Accordingly, the present invention provides the ability to replenish bottles from a separate storage location and feed multiple labelers simultaneously. More specifically, the preferred embodiment of the system provides the ability to utilize the feed process from one storage hopper to distribute bottles to several labelers, gaining the ability to shift distribution flow to labelers with the greatest replenishment need. For example, if a sensor located at a first labeler determines that the bottle queue is short, the control system is programmed to generate a signal to the control gate to deliver more bottles to the first labeler. In the preferred embodiment, the system can deliver a predetermined number of bottles to the first labeler by controlling the system.

For example, for each labeler, the bottle tube holding the bottles has three photo-eye (photoelectric) sensors (high and low). The level of vials in the tube is monitored by these sensors, which are connected to a control program. When the "high" sensor does not see a vial, the control program will release a small number of vials from the blower. When the "low" sensor does not see a vial, then the control program will release a larger number of vials. In one embodiment, the control system is a "soft-plc" that serves as a translation layer between the hardware and software control system with some logic capabilities. In the preferred embodiment, the blower is not constant and operates on-demand depending on the vial levels at the labeler.

Figure 5:
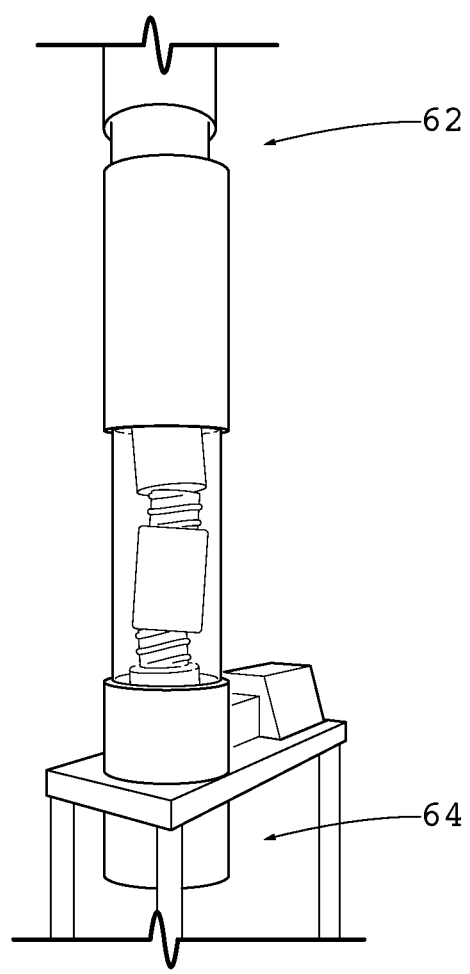
FIG. 5 illustrates one embodiment of the sensors used with the present invention.

FIG. 5 illustrates one embodiment of a sensor configuration installed in conjunction with the metering device of FIG. 4. The sensor configuration is comprised of a high-level limit sensor 62 and a low-level limit sensor 64. When the high-level limit sensor detects that the tube is full, it sends a signal to the blower to stop sending further vials. When the low-level limit sensor does not detect a vial, it initiates a signal to the blower, through a controller, to send vials until the tube fills up to the high-level limit.

The ABS-PVC material used to make the housing and other components withstands impact better than other plastics. The ABS-PVC blend on hand for printing on-demand also eliminates time spent waiting for a vendor to deliver a replacement part, time that will prove critical given the volume automated pharmacies face.

While certain embodiments of the present invention are described in detail above, the scope of the invention is not to be considered limited by such disclosure, and modifications are possible without departing from the spirit of the invention as evidenced by the following claims:

What is claimed is:

1. A system for moving vials along an automated dispensing line having a first horizontal conveyor adapted to move vials in the horizontal direction to a first vertical pneumatic conveyor positioned below the first horizontal conveyor, comprising:

a first rotating portion comprised of a plurality of apertures disposed in a circular arrangement, each of the apertures adapted to accept and hold one of the vials;

a motor operationally connected to the first rotating portion for driving the first rotating portion; and a guide mechanism operationally connected between the first rotating portion and the first vertical pneumatic conveyor for guiding a vial as it moves between the first rotating portion and the first vertical pneumatic conveyor; and wherein the system is adapted to move vials held in each of the apertures of the first rotating portion to the first vertical pneumatic conveyor when the vials are moving from the first horizontal conveyor to the first vertical pneumatic conveyor by rotating the first rotating portion in a circular direction.

2. The system of claim 1, wherein the guide mechanism has a hole for accepting each vial as it drops from each aperture of the first rotating portion into the first pneumatic conveyor.

3. The system of claim 1, wherein the guide mechanism is a funnel portion for guiding the vials as they move between the first rotating portion and the first vertical pneumatic conveyor.

4. The system of claim 1, wherein the first rotating portion has six apertures disposed in a circular arrangement.

5. The system of claim 1, further comprising a high-limit sensor operationally connected to the first vertical pneumatic conveyor configured to sense for vials in the first vertical pneumatic conveyor and a low-limit sensor operationally connected to the first vertical pneumatic conveyor configured to sense for vials in the first vertical pneumatic conveyor.

6. The system of claim 5, wherein the system is adapted to send a signal to stop the sending of vials when the high-limit sensor senses a vial in the first vertical pneumatic conveyor.

7. The system of claim 6, wherein the system is adapted to send a signal to send vials when the low-limit sensor does not detect the presence of a vial in the first vertical pneumatic conveyor.

8. The system of claim 1, wherein the first vertical pneumatic conveyor is a tube adapted to accept and move vials.

9. The system of claim 1, further comprising a housing attached to the first vertical pneumatic conveyor for enclosing the first rotating portion.

10. The system of claim 1, wherein the housing is comprised of an opening for accepting vials.

11. A system for moving vials along an automated dispensing line, comprising:

a first horizontal conveyor adapted to move vials in the horizontal direction;

a first vertical pneumatic conveyor positioned below the first horizontal conveyor having an opening for accepting vials;

a first rotating portion comprised of a plurality of apertures disposed in a circular arrangement, each of the apertures adapted to accept and hold one of the vials;

a motor operationally connected to the first rotating portion for driving the first rotating portion;

wherein the first rotating portion is positioned to accept a vial into each of the apertures of the first rotating portion from the first horizontal conveyor as the first rotating portion rotates in a circular direction; and wherein the system is adapted to rotate the first rotating portion to position each aperture of the first rotating portion over the opening of the first vertical pneumatic conveyor successively as the motor drives the first rotating portion in a circular direction so that vials held in each of the apertures fall into the first vertical pneumatic conveyor.

12. The system of claim 11, further comprising a guide mechanism operationally connected between the first rotating portion and the first vertical pneumatic conveyor for guiding a vial as it moves from the first rotating portion to the first vertical pneumatic conveyor.

13. The system of claim 12, wherein the guide mechanism is a funnel portion for guiding the vials as they move between the first rotating portion and the first vertical pneumatic conveyor.

14. The system of claim 12, wherein the guide mechanism has a hole for accepting each vial as it drops from each aperture of the first rotating portion into the first pneumatic conveyor.

15. The system of claim 14, wherein the system is adapted to position each aperture of the first rotating portion over the hole in the guide mechanism successively as the motor drives the first rotating portion in a circular direction.

16. The system of claim 15, wherein a vial held in each aperture drops into the vertical pneumatic conveyor when it is positioned over the hole in the guide mechanism.

17. The system of claim 11, wherein the first rotating portion has six apertures disposed in a circular arrangement.

18. A system for moving vials along an automated dispensing line, comprising:

a first horizontal conveyor adapted to move vials in the horizontal direction;

a first vertical pneumatic conveyor positioned above the first horizontal conveyor;

a first rotating portion comprised of a plurality of apertures disposed in a circular arrangement, each of the apertures adapted to accept and hold one of the vials;

a motor operationally connected to the first rotating portion for driving the first rotating portion;

wherein the first rotating portion is positioned to accept a vial into each of the apertures of the first rotating portion from the first vertical pneumatic conveyor as the first rotating portion rotates in a circular direction; and wherein the system is adapted to rotate the first rotating portion to position each aperture of the first rotating portion over the first horizontal conveyor successively as the motor drives the first rotating portion in a circular direction so that vials held in each of the apertures fall onto the first horizontal conveyor.

19. The system of claim 18, further comprising a guide mechanism operationally connected between the first rotating portion and the first vertical pneumatic conveyor for guiding a vial as it moves from the first vertical pneumatic conveyor to the first rotating portion.

20. The system of claim 19, wherein the guide mechanism is a funnel portion for guiding the vials as they move between the first rotating portion and the first vertical pneumatic conveyor.

21. The system of claim 19, wherein the system is adapted to position each aperture of the first rotating portion under a hole in the guide mechanism successively as the motor drives the first rotating portion in a circular direction.

22. The system of claim 21, wherein the system is adapted to drop a vial into one of the apertures when the aperture is positioned under the hole in the guide mechanism.

23. The system of claim 22, further comprising a bottom support plate having a slot for ensuring proper positioning of the vials onto the first horizontal conveyor as they move from the first rotating portion onto the first horizontal conveyor.

24. The system of claim 18, wherein the first rotating portion has eight apertures disposed in a circular arrangement.

25. The system of claim 18, further comprising a high-limit sensor operationally connected to the first vertical pneumatic conveyor configured to sense for vials in the first vertical pneumatic conveyor and a low-limit sensor operationally connected to the first vertical pneumatic conveyor configured to sense for vials in the first vertical pneumatic conveyor.

26. The system of claim 25, wherein the system is adapted to send a signal to stop the sending of vials when the high-limit sensor senses a vial in the first vertical pneumatic conveyor.

27. The system of claim 26, wherein the system is adapted to send a signal to send vials when the low-limit sensor does not detect the presence of a vial in the first vertical pneumatic conveyor.

28. The system of claim 18, wherein the first vertical pneumatic conveyor is a tube adapted to accept and move vials.

29. The system of claim 18, further comprising a housing attached to the first vertical conveyor for enclosing the first rotating portion.

\* \* \* \* \*